US011943859B2

(12) United States Patent
Almolda Fandos et al.

(10) Patent No.: US 11,943,859 B2
(45) **Date of Patent: *Mar. 26, 2024**

(54) COOKING APPLIANCE

(71) Applicant: BSH Hausgeräte GmbH, Munich (DE)

(72) Inventors: Manuel Almolda Fandos, Saragossa (ES); Pablo Jesus Hernandez Blasco, Saragossa (ES); Izaskun Jaca Equiza, Saragossa (ES); Ignacio Lope Moratilla, Saragossa (ES); Damaso Martin Gomez, Saragossa (ES); Alvaro Rigual Iturria, Saragossa (ES)

(73) Assignee: BSH Hausgeräte GmbH., Munich (DE)

( * ) Notice: Subject to any disclaimer, the term of this patent is extended or adjusted under 35 U.S.C. 154(b) by 611 days.

This patent is subject to a terminal disclaimer.

(21) Appl. No.: 17/053,368

(22) PCT Filed: Jun. 5, 2019

(86) PCT No.: PCT/IB2019/054674

§ 371 (c)(1),
(2) Date: Nov. 6, 2020

(87) PCT Pub. No.: WO2019/243931

PCT Pub. Date: Dec. 26, 2019

(65) Prior Publication Data

US 2021/0195700 A1 Jun. 24, 2021

(30) Foreign Application Priority Data

Jun. 21, 2018 (ES) ................................ ES201830617

(51) Int. Cl.
*H05B 6/12* (2006.01)
*H05B 6/10* (2006.01)

(52) U.S. Cl.
CPC ........... *H05B 6/129* (2013.01); *H05B 6/1245* (2013.01); *H05B 2206/022* (2013.01)

(58) Field of Classification Search
CPC ........................ H05B 2206/022; H05B 6/1245; H05B 6/129; H05B 6/1281; H01L 27/15;
(Continued)

(56) References Cited

U.S. PATENT DOCUMENTS

2006/0191912 A1 8/2006 Roth
2011/0155723 A1 6/2011 Liu et al.
(Continued)

FOREIGN PATENT DOCUMENTS

WO 2018116061 A1 6/2018
WO 2018116062 A1 6/2018

OTHER PUBLICATIONS

National Receipt Search Report ES201830617 dated Jun. 21, 2018.
International Search Report PCT/IB2019/054674 dated Sep. 5, 2019.

*Primary Examiner* — Quang T Van
(74) *Attorney, Agent, or Firm* — Michael E. Tschupp; Andre Pallapies; Brandon G. Braun

(57) ABSTRACT

A cooking appliance device includes a heating unit including an induction coil having an electric conductor, a substrate unit, and a fastening unit configured to fasten the induction coil to the substrate unit. The fastening unit fastens the electric conductor in at least one region on the substrate unit such that the electric conductor is movable relative to the substrate unit.

22 Claims, 8 Drawing Sheets

(58) Field of Classification Search
CPC ....... H01L 27/153; H01L 33/08; H01L 33/38; H01L 33/44; H01L 33/486; H01L 33/56
USPC ....... 219/624, 620, 622, 630, 634, 635, 647, 219/672, 675, 447.1, 448.17
See application file for complete search history.

(56) References Cited

U.S. PATENT DOCUMENTS

| | | | | |
|---|---|---|---|---|
| 2016/0302263 | A1 | 10/2016 | Dalaker et al. | |
| 2021/0195701 | A1 * | 6/2021 | Almolda Fandos ... | H05B 6/129 |

* cited by examiner

COOKING APPLIANCE

CROSS-REFERENCES TO RELATED APPLICATIONS

This application is the U.S. National Stage of International Application No. PCT/IB2019/054674, filed Jun. 5, 2019, which designated the United States and has been published as International Publication No. WO 2019/243931 A1 and which claims the priority of Spanish Patent Application, Serial No. P201830617, filed Jun. 21, 2018, pursuant to 35 U.S.C. 119(a)-(d).

BACKGROUND OF THE INVENTION

The invention relates to a cooking appliance device and to a method for producing a cooking appliance device.

Hobs which have heating units with induction coils, which are fastened to a substrate unit, are known from the prior art. The substrate unit is provided to retain the induction coil relative to a hotplate and to define a course of a conductor of the induction coil. Various methods are known for fastening induction coils to the substrate unit, for instance the use of brackets, screws, flaps, adhesives, and plastic profiles is known. These known solutions are however only suited specifically to operating temperatures of above 500° C. since the use of special heat-resistant materials is expensive and current fixing methods are not designed for a thermal expansion of the induction coil.

BRIEF SUMMARY OF THE INVENTION

The object of the invention consists in particular in providing a generic device with improved properties with respect to robustness and cost-efficiency.

The invention is based on a cooking appliance device, in particular an induction oven device, with at least one heating unit, which has at least one induction coil with at least one electrical conductor, at least one substrate unit and at least one fastening unit, which fastens the induction coil to the substrate unit.

In one aspect of the invention, it is proposed that the fastening unit fastens the conductor in at least one region to the substrate unit so as to be movable relative to the substrate unit. In this way a robustness can be increased in particular. Changes to a course of the conductor can advantageously be balanced out and/or compensated for by a thermal expansion of the induction coil. In particular, a deformation of the induction coil as a result of the thermal expansion from a main extension plane of the induction coil can advantageously be avoided. Furthermore, damage to the fastening unit can advantageously be avoided by the thermal expansion of the induction coil.

A "cooking appliance device", in particular an "induction oven device" is understood to mean in particular at least one part, in particular a subassembly, of a cooking appliance, in particular an induction oven. In particular, the cooking appliance device, in particular the induction oven device, can also comprise the entire cooking appliance, in particular the entire induction oven. A "cooking appliance" is to be understood to mean in particular a household appliance, which is provided to heat up and/or keep an item of crockery and/or a food to be cooked to/at a predefined temperature for preparation and/or storage purposes. Exemplary cooking appliances are ovens and/or microwaves and/or barbecue grills and/or steam cookers and/or hobs.

The cooking appliance preferably has at least an internal housing and external housing. An "internal housing" is to be understood to mean in particular a wall unit, which delimits at least one interior, in particular a cooking compartment, at least to a large extent outward, and is itself delimited outward at least by the external housing. The internal housing advantageously has a ferromagnetic metal. The induction coil is particularly advantageously provided to inductively heat at least one part of the internal housing during operation of the cooking appliance device. The part of the internal housing preferably comprises a ceiling wall and/or a base wall of the internal housing, in particular to provide a conventional heating mode known as "top and bottom heating". The internal housing is preferably embodied as a cooking baffle. A "cooking baffle" is to be understood to mean an internal housing, which bounds a cooking compartment of an induction oven together with an oven door of the induction oven at least to a large extent outward. An "oven door" is to be understood to mean in particular a wall which, in a closed state, completely covers an opening of the cooking compartment which faces an operator, and in an open state, releases the opening at least partially. An "external housing" of an appliance is understood to mean in particular a wall unit, which defines an outer surface of the appliance at least to a large extent. "At least to a large extent" in this context is to be understood to mean in particular at least 60%, advantageously at least 70%, particularly advantageously at least 80%, preferably at least 90% and particularly preferably completely.

A "heating unit" is to be understood to mean in particular a unit which is provided to heat and/or keep warm at least one food to be cooked and/or item of crockery arranged in a predefined heating zone. In particular, the heating unit has at least one induction coil, through which current flows in particular during operation of the heating unit and at least one electromagnetic field for heating and/or keeping warm the food to be cooked and/or item of crockery. The induction coil has at least one conductor, which can be produced for instance by means of stamping and/or sawing and/or cutting, in particular beam cutting, a metal plate. In particular, the conductor can be embodied as an individual wire and/or preferably as a stranded wire. In particular, a stranded structure of a conductor embodied as a stranded wire can compensate for the thermal expansion of the conductor. The conductor advantageously has at least one coating, which thermally and/or electrically insulates the conductor.

A "substrate unit" is to be understood to mean in particular a unit, which can be connected in particular fixedly with the internal housing and which is provided to retain the induction coil relative to the internal housing and/or to the item of crockery and or food to be heated up. In particular, the substrate unit is arranged between the induction coil and the internal housing. Alternatively, the induction coil could be arranged between the substrate unit and the internal housing. It would be conceivable for the cooking appliance device to have a number of substrate units, which are arranged in particular stacked and in each case retain a winding of the induction coil preferably between individual layers. It would be conceivable for the internal housing to be used to receive at least the heating unit. For instance, the substrate unit could be glued and/or riveted and/or screwed to the internal housing. It would be conceivable for the substrate unit to be fastened directly on the internal housing, in particular to be embodied in one piece with the internal housing. In this way in particular a distance between the induction coil and the internal housing can be minimized. "Embodied in one piece" is to be understood to mean in particular at least connected with a material bond, for instance by means of a welding process, an adhesion process, an injection process and/or another process which appears to be useful to the person skilled in the art and/or advantageously molded in one piece, such as for instance by means of manufacture from a cast and/or by manufacture in a single or multicomponent injection method and advantageously from an individual blank.

In particular, the substrate unit could be fastened indirectly to the internal housing. Further the heating unit could have at least one thermal insulation, by way of which the substrate unit is fastened indirectly to the internal housing. The substrate unit preferably has at least one heat-resistant material. "Heat-resistant material" is to be understood to mean in particular a material which withstands temperatures of at least 500° C., advantageously at least 550° C. and preferably at least 600° C., without changing chemically. The substrate unit particularly advantageously has at least one electrically insulating material. An "electrically insulating material" is to be understood to mean in particular a material which has a specific electrical resistance of at least $10^{12}$ ($\Omega mm^2$) and is non-conducting in particular at least with respect to a current flowing through the induction coil during operation. It would be conceivable for the substrate unit to consist at least partially of at least one heat-resistant plastic.

Preferably the substrate unit consists at least partially, preferably to a large extent and particularly advantageously entirely from a material which contains at least the chemical elements silicon and oxygen. The substrate unit preferably has at least one silicate. A "silicate" is to be understood to mean in particular a salt and/or an ester of an orthosilicic acid and in particular also its condensate. In particular, a mineral is to be understood here, the chemical composition of which has at least one $SiO_4$ tetrahedron. Exemplary applications for silicates are fibers and/or glasses. The substrate unit preferably has at least basalt, spar, dolomite, diabase, anorthosite, coke, glass fibers, soluble glass and/or mica. The substrate unit is embodied particularly preferably in a mat-like manner. A "mat-like element" is to be understood to mean in particular an element, for which a smallest possible, notional square exists, which just receives the element, the shortest side of which corresponds to at most 30%, advantageously at most 20%, particularly advantageously at most 10%, preferably at most 5% and particularly preferably at most 2% of a longest side of the square. In particular a mat-like element can be expanded, preferably folded. In particular, the substrate unit can also be embodied in a plate-like manner. The substrate unit preferably has a thickness of at most 500 μm, advantageously at most 450 μm, particularly advantageously at most 400 μm, preferably at most 300 μm and particularly preferably at most 200 μm.

The fact that the fastening unit fastens the conductor to the substrate unit "in at least one region so as to be movable relative to the substrate unit" is to be understood to mean in particular that the induction coil can move within the region relative to the substrate unit, in particular an edge region of the region generates a stop, which prevents a further movement of the induction coil. A length of a permitted movement of the conductor advantageously corresponds to at least 50%, advantageously at least 70%, particularly advantageously at least 90% and preferably at least 100% of a conductor thickness of the conductor. A permitted movement of the conductor preferably corresponds to an expansion movement produced by a thermal expansion of the induction coil, preferably during an operation of the induction coil. A permitted movement of the conductor particularly preferably corresponds to a shrinking movement produced by a thermal shrinkage of the induction coil. In particular the region can extend over the entire induction coil. The region advantageously has a further winding which is identical in particular to a winding of the induction coil. For instance, the induction coil with the substrate unit can be glued, sewn, welded, and/or inserted into the substrate unit.

A "fastening unit" is to be understood to mean in particular a unit which is provided to fasten the induction coil at least partially, in particular entirely, to the substrate unit. In particular, the fastening unit is embodied separately from the substrate unit and/or the conductor. The fastening unit preferably has at least one heat-resistant and/or electrically insulating material. It is advantageously possible to dispense with using additional thermal insulations for the fastening unit and/or the substrate unit. For instance, the fastening unit could have a material which is identical to a material of the substrate unit. In particular, the fastening unit can have at least one fastening element for fastening the induction coil to the substrate unit. The fastening element can be a bracket, a screw, a flap, an adhesive and/or a plastic profile, for instance.

"Provided" is to be understood to mean in particular specially designed and/or equipped. The fact that an object is provided for a specific function is to be understood to mean in particular that the object fulfils and/or carries out this specific function in at least one application and/or operating state.

In a further aspect of the invention, which can be considered separately from or in combination with further aspects of the invention, it is proposed that the fastening unit has at least one thread and the induction coil is fastened to the substrate unit by means of at least one joint having the thread. The fact that the induction coil is fastened "by means of a joint having the thread" is to be understood to mean in particular that the thread penetrates the substrate unit at least once and, in this way, defines the region. In particular, the thread can run at a minimal distance from the conductor. The fact that the thread runs "at a minimal distance" from the conductor is to be understood to mean in particular that the thread runs within a close-up range of the conductor, which extends at most by 100%, advantageously at most by 80%, particularly advantageously at most by 60%, preferably at most by 40% and particularly preferably at most by 20% of a width of the conductor at right angles to a longitudinal direction of the conductor. Alternatively the thread can run at a distance from the conductor. A course of the thread advantageously corresponds to a course of the stop. In particular the fastening unit can have further joints having further threads, by means of which the induction coil is fastened to the substrate unit. The thread preferably has at least one heat-resistant and electrically-insulating material. For instance, the thread could have a material which is identical to a material of the substrate unit. In particular, the thread can penetrate the substrate unit according to different, standardized sewing methods, which are carried out in particular in ASTM D-6193 and ISO 4915:1991. For instance, the joint and/or the further joints can run in accordance with a Lockstitch method and/or a zig-zag method. In particular, a longitudinal direction of the thread can correspond to a longitudinal direction of a closest-lying conductor segment of the conductor. This in particular increases robustness and enables a simplified production of the cooking appliance device. The induction coil can advantageously also be kept at high temperatures and insulated electrically. Fastening the induction coil to the substrate unit can be established particularly advantageously by current, automatically implementable methods.

Furthermore, it is proposed that the fastening unit has at least one further thread and the induction coil is fastened to the substrate unit by means of at least one further joint having the further thread. Both threads preferably have courses which are identical to one another. In particular, both threads could have courses which are mirror-inverted with respect to one another. It would be conceivable for both threads to intersect at least in sections. Advantageously both threads define the region. Both threads, when viewed at right angles onto the substrate, are arranged particularly advantageously on opposing sides of the conductor. "Opposing sides of the conductor" are to be understood to mean in particular two subregions, which rest against a conductor segment, wherein viewed from the conductor segment a first subregion of a coil center is facing the inductor coil and a second subregion is facing away from the coil center. In this way a robustness can in particular be further increased. Advantageously a stability of the region can be increased. Particularly advantageously an expansion of the region can be selected more flexibly.

Furthermore, it is proposed that the thread and in particular the further thread, when viewed at right angles onto the substrate unit, run at least in sections across the conductor and/or intersect the conductor. "Viewed at right angles onto an object" is to be understood to mean in particular a viewing direction which runs along a straight line, which intersects the object at a right angle. With a flat object, the viewing direction runs at right angles to a main extension plane of the object. A "main extension plane" of an object is to be understood to mean in particular a plane which is parallel to a largest side surface of a smallest notional square which just encloses the object entirely and in particular runs through the center point of the square. When viewed at right angles, advantageously at least one cohesive side of the object is completely visible. The fact that the thread "runs and/or intersects" in sections across the conductor is to be understood to mean in particular that the thread runs in a segment at least once from a first side of the conductor to an opposing second side of the conductor. The thread advantageously runs across and/or intersects the conductor repeatedly, in particular at periodic intervals. In particular, the thread can run across a complete periphery of the conductor. The thread preferably runs at most across one part, in particular at most one half, of the periphery of the conductor. Particularly advantageously the thread runs and/or intersects the thread periodically in the entire region. This can further increase in particular robustness and further simplify the production of the cooking appliance device. Advantageously a movement of the induction coil at right angles to a main extension plane of the substrate unit can be restricted without using further fastening elements. An advantageous assembly can be enabled particularly advantageously since the induction coil can be wound and fastened in particular in one method step.

In an advantageous embodiment, it is proposed that the thread and in particular the further thread, when viewed at right angles onto the substrate, runs at least in sections, preferably constantly, laterally adjacent, in particular parallel, to the conductor. In particular, the thread and/or the further thread runs at a distance from the conductor, which corresponds at least 50%, advantageously at least 70%, particularly advantageously at least 80% and preferably at least 90% to the conductor thickness. In particular, the thread and/or the further thread can run between two windings of the conductor. In this way the cooking appliance device can be produced in particular in a simple manner. The induction coil can advantageously be fastened easily to the substrate unit. The region can particularly advantageously define a fixed conductor distance from the induction coil.

Furthermore, it is proposed that the further thread, when viewed at right angles onto the substrate unit, runs at least in sections laterally adjacent to the conductor and on a side of the conductor opposing the thread. In particular, a further distance of the further thread from the conductor is identical to the distance of the thread from the conductor. Alternatively, the distance of the further thread from the conductor could differ from the distance of the thread from the conductor. In particular, the thread and the further thread can intersect at least in sections, preferably periodically, and the change the sides. A distance of the thread from the further thread minus a thickness of the conductor preferably corresponds to the length of the expansion movement. In this way, support of the induction can be improved in particular. Advantageously, the induction coil can be held effectively in a state prior to thermal expansion and also in a state following thermal expansion.

The region advantageously has at least two subregions which oppose one another with respect to a coil center of the induction coil, in which the fastening unit fastens the conductor movably to the substrate unit in each case relative to the substrate unit. "Two subregions which oppose one another with respect to a coil center" are to be understood to mean in particular two subregions of the induction coil, which can be connected, when viewed at right angles onto the substrate unit, at least to a large extent by straight lines, which intersect the coil center. Both subregions preferably have identical expansions. In particular, the induction coil can be fastened movably to the substrate unit at numerous pairs of opposing subregions relative to the substrate unit. In this way a robustness can in particular be further increased. Advantageously a rotation of the induction coil about an axis of rotation parallel to a main extension plane of the substrate unit can be restricted.

In particular, permitted movements of the conductor comprise at least one movement along a direction which faces radially away from a coil center of the induction coil. Advantageously a length of the movement corresponds at least to the expansion movement of the induction coil produced by the thermal expansion of the induction coil. At least the edge region of the region, in particular the entire region, is preferably facing the coil center when viewed from a nearest conductor segment. In this way a robustness can be further increased here. Advantageously, after operation of the induction coil, a movement of the conductor into a starting position prior to operation of the induction coil can be supported.

In a preferred embodiment of the invention, it is proposed that the fastening unit has at least one cover element, which is arranged at least in the region on a side of the induction coil opposing the substrate unit and, on this side, restricts a movement of the induction coil. It would be conceivable for the fastening unit to have a plurality of cover elements, which together cover the entire region. The cover element is preferably fastened to the substrate unit by means of the thread and/or joint having further threads and/or further joint. The fastening unit preferably has precisely one cover element, which covers in particular the entire induction coil. In particular, a main extension plane of the cover element runs parallel to a main extension plane of the induction coil. The cover element advantageously has at least one electrically-insulating and/or heat-resistant material. The cover element preferably has a material which is identical to a material of the substrate unit. In particular, the cover element can be embodied in one piece with the substrate unit. It would be conceivable for the cover element and the substrate unit to be embodied as adjoining subregions of an element of the fastening unit and advantageously to be arranged around the induction coil by folding the element. In this way in particular support of the induction coil can be improved. Advantageously a movement of the induction coil along a direction at right angles to a main extension plane of the substrate unit can be avoided.

Moreover, it is proposed that the substrate unit and the cover element touch at least in sections in the region and form at least one stop with respect to a permitted movement of the conductor. The substrate unit and the cover element advantageously touch at least in the edge region, preferably in the entire edge region. The substrate unit and the cover element particularly advantageously touch on the joint and/or the further joint. In particular, the stop can only be released by means of a tool. The stop is produced, for instance, by means of stamping, adhesion, sewing and/or clamping of the cover element and the substrate unit. The substrate unit is particularly advantageously sewn together with the cover element in the region at least in sections by the thread and/or the further thread. The substrate unit and the cover element preferably touch along an outer edge of the induction coil. The substrate unit and the cover element particularly preferably together form a sleeve, which surrounds the induction coil at least to a large extent. In this way the cooking appliance device can be produced and assembled easily. The induction coil can advantageously be fastened to the cover element by connecting the substrate unit. The heating unit can particularly advantageously be embodied as a compact, portable unit, which is easy to transport and assemble.

Furthermore, it is proposed that the cover element is embodied at least substantially identically to the substrate unit. The fact that the cover element is embodied "at least substantially identically" to the substrate unit is to be understood to mean in particular that a volume and/or a mass of the cover element is embodied to be identical by at least 60%, advantageously at least 70%, particularly advantageously at least 80%, preferably at least 90% and particularly preferably entirely to a further volume and/or to a further mass of the substrate unit. The cover element in the region is advantageously embodied to be identical to the substrate unit. It is conceivable for the cover element and the substrate unit to be embodied differently from one another outside of the region. The cover element is preferably embodied completely identical to the substrate unit. In this way in particular production of the cooking appliance device can be further simplified. The number of different components, which is required to produce the cooking appliance device, can advantageously be reduced.

The invention is based further on a method for producing a cooking appliance device, in particular an induction oven device, with at least one heating unit, which has at least one induction coil with at least one electrical conductor and at least one substrate unit, wherein the induction coil is fastened to the substrate unit.

It is proposed that the conductor is fastened in at least one region to the substrate unit so as to be movable relative to the substrate unit. This can in particular improve robustness and simplify manufacture of the cooking appliance device.

In this regard the cooking appliance device should not be restricted to the afore-described application and embodiment. In particular, the cooking appliance device can have a number which deviates from a number of individual elements, components and units cited herein, in order to fulfil a mode of operation described here.

Further advantages result from the following description of the drawing. Exemplary embodiments of the invention are shown in the drawings. The drawings, the description and the claims contain numerous features in combination. The person skilled in the art will expediently also observe features individually and combine them to form useful further combinations.

DETAILED DESCRIPTION OF EXEMPLARY EMBODIMENTS OF THE PRESENT INVENTION

Figure 1:
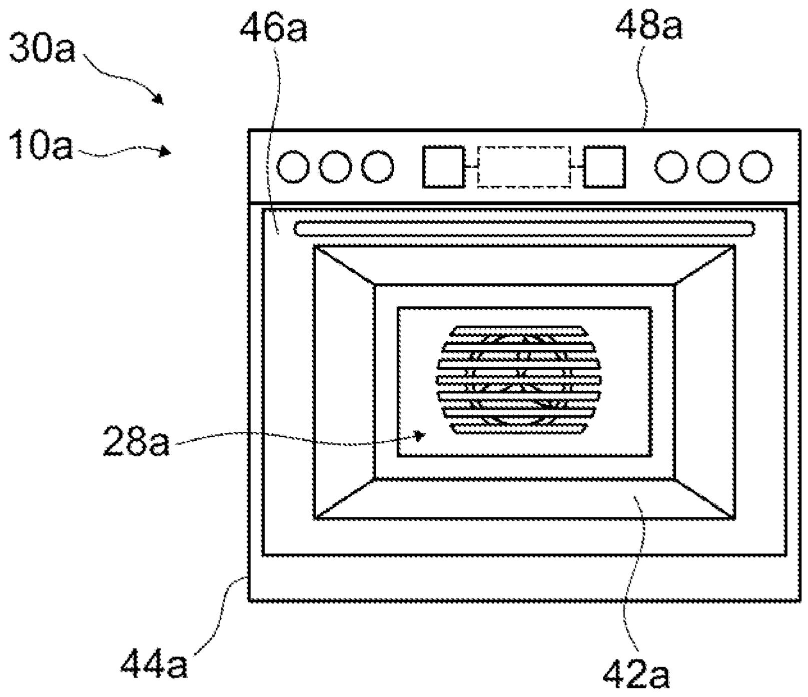
FIG. 1 a schematic front view of a cooking appliance with a cooking appliance device, FIG. 2 an exploded view of a part of the cooking appliance device, FIG. 3 a schematic oblique view of a part of the cooking appliance device with a heating unit, FIG. 4 a schematic top view of the heating unit with an induction coil and a substrate unit, FIG. 5 a schematic flow chart of a method for producing the cooking appliance device, FIG. 6*a* a schematic top view of a part of a cooking appliance device with a first relative arrangement of a conductor with respect to a thread, FIG. 6*b* a schematic top view of a part of a cooking appliance device with a second relative arrangement of a conductor with respect to a thread, FIG. 6*c* a schematic top view of a part of a cooking appliance device with a third relative arrangement of a conductor with respect to a thread, FIG. 7*a* a schematic top view of a part of a cooking appliance device with a further thread at a minimal distance from the side and a thread at a minimal distance from the opposing side, FIG. 7*b* a schematic top view of a part of a cooking appliance device with a further thread at a minimal distance from the side and a thread which runs at a distance from the opposing side, FIG. 7*c* a schematic top view of a part of a cooking appliance device with a further thread which runs at a distance on the side and a thread which is at a minimal distance from the opposing side, FIG. 8*a* a schematic top view of a cut-out of a cooking appliance device with a thread which intersects a conductor and which rests on the conductor, FIG. 8*b* a schematic top view of a cut-out of a cooking appliance device with a thread which intersects a conductor, and which runs in sections at a distance from the conductor, and FIG. 9 a schematic flow chart of a further method for producing the cooking appliance device from FIG. 8*b*.

Of multiple objects available, only one is provided with a reference character in the figures.

FIG. 1 shows a cooking appliance 30*a*. The cooking appliance 30*a* is embodied as an induction oven. The cooking appliance 30*a* has an external housing 44*a*. The external housing 44*a* defines an outer contour of the cooking appliance 30*a*. The external housing 44*a* receives a user interface 48*a* of the cooking appliance 30*a*. The user interface 48*a* is provided to be operated by an operator to control the cooking appliance 30*a*. The cooking appliance 30*a* has an internal housing 42*a*. The internal housing 42 a consist of a ferromagnetic metal. Alternatively, the internal housing 42*a* could have a nonmagnetic material, in particular glass, preferably glass ceramic. In this alternative embodiment, the internal housing 42*a* has a number of heating elements (not shown), which consist of a ferromagnetic metal. The cooking appliance 30*a* has an oven door 46*a*. The oven door 46*a* is located in a closed state. The oven door 46*a* covers an opening 52*a* of a cooking compartment 28*a*, which faces an operator. The oven door 46*a* and the internal housing 42*a* mutually delimit the cooking compartment 28*a* outward. The cooking appliance 30*a* has a cooking appliance device 10*a*. The cooking appliance device 10*a* is embodied as an induction oven device.

Figure 2:
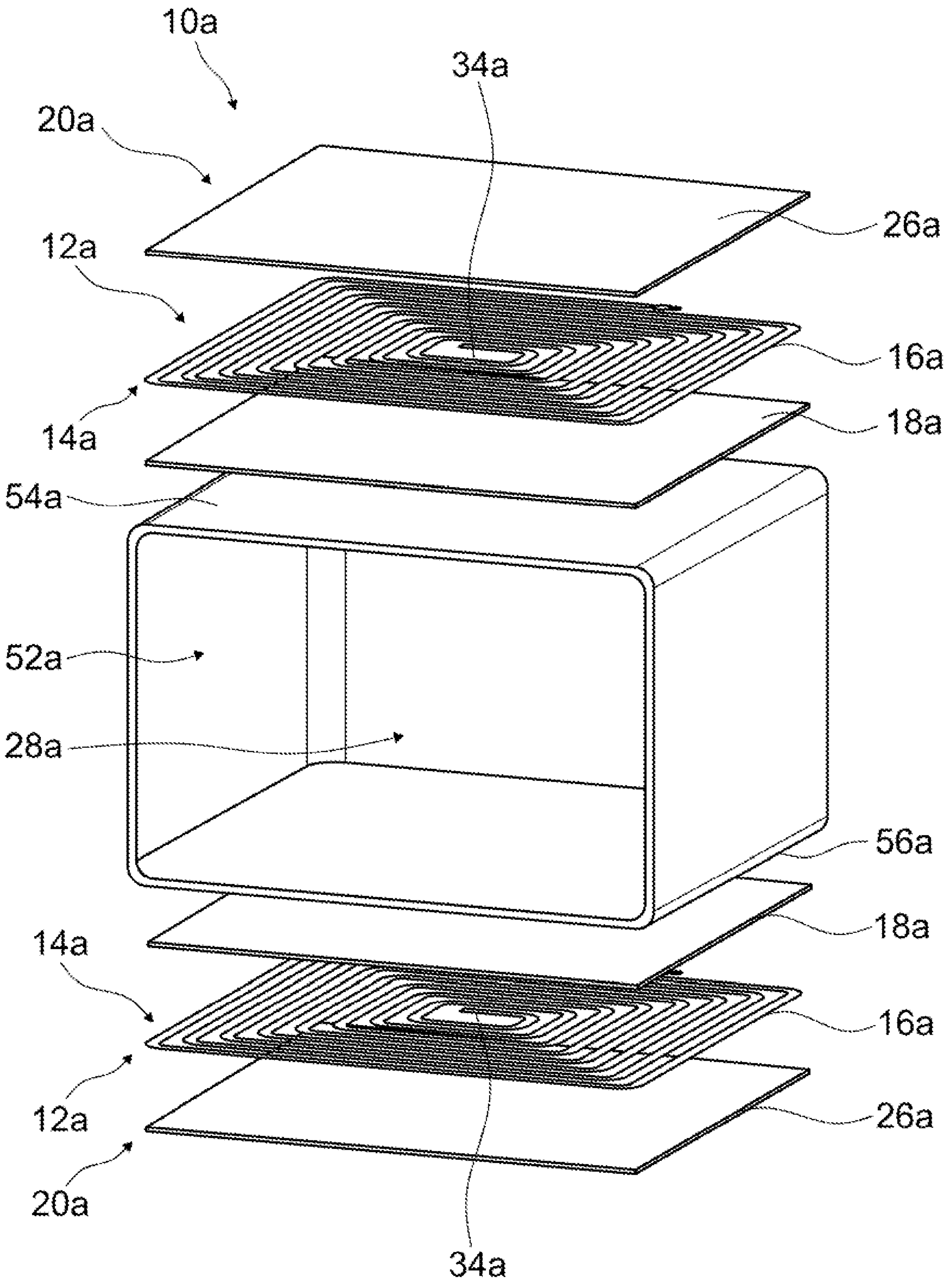

Part of the cooking appliance device 10*a* is shown in more detail in an exploded view in FIG. 2. The cooking appliance device 10*a* has the internal housing 42*a*. The cooking appliance device 10*a* has two heating units 12*a*. The heating units 12*a* are embodied to be identical to one another. The heating units 12*a* are arranged on a ceiling wall 54*a* and on a base wall 56*a* of the internal housing 42*a*. Alternatively or in addition it would be conceivable for the heating units 12*a* to be arranged on side walls or a rear wall of the internal housing 42*a*. Only one of the heating units 12*a* is described below.

The heating unit 12*a* has an induction coil 14*a*. During operation of the heating unit 12*a*, alternating current passes through the induction coil 14*a* and generates an electromagnetic alternating field. The induction coil 14*a* is embodied to be plate-shaped. A main extension plane (not shown) of the induction coil 14*a* runs parallel to a main extension plane of the ceiling wall 54*a* and the base wall 56*a*. The induction coil 14*a* has a conductor 16*a*. The conductor 16*a* is embodied as an individual wire. The conductor 16*a* is embodied as a blank individual wire. Alternatively, the conductor 16*a* could have an insulator. The conductor 16*a* has aluminum. Alternatively, the conductor 16*a* could have copper. The conductor 16*a* is arranged as a rectangular spiral. The conductor 16*a* is wound around a coil center 34*a* of the induction coil 14*a*.

The heating unit 12*a* has a substrate unit 18*a*. The substrate unit 18*a* is embodied in a mat-like manner. The substrate unit 18*a* is arranged between the induction coil 14*a* and the internal housing 42*a*. The induction coil 14*a* rests completely on the substrate unit 18*a*. The substrate unit 18*a* is used to thermally and electrically insulate the induction coil 14*a*. The substrate unit 18*a* consists at least to a large extent of a material which has at least the chemical elements Si and O. The material is a silicate. The substrate unit 18*a* is fibrous. The substrate unit 18*a* consists of mineral wool. The substrate unit 18*a* has basalt fibers. Alternatively or in addition, the substrate unit 18*a* could have spar fibers, dolomite fibers, diabase fibers, anorthosite fibers and/or coke fibers. The substrate unit 18*a* can be penetrated at least partially for fastening the induction coil 14*a*. The substrate unit 18*a* consists entirely of a two-dimensional textile structure. The substrate unit 18*a* consists entirely of a basalt tissue. Alternatively, the substrate unit 18*a* could consist partially of the basalt tissue. The substrate unit 18*a* has a plurality of feedthrough openings 24*a*. The feedthrough openings 24*a* are arranged periodically. The feedthrough openings 24*a* are arranged along a plurality of straight lines.

Figure 3:
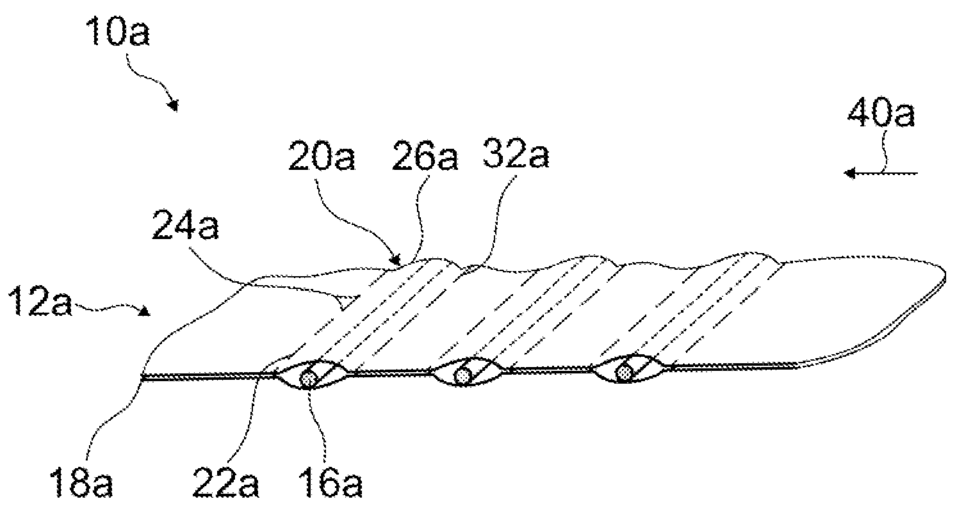

The heating unit 12*a* has a fastening unit 20*a* (cf. FIG. 3). The fastening unit 20*a* fastens the induction coil 14*a* to the substrate unit 18*a*. The fastening unit 20*a* fastens the conductor 16*a* in a region to the substrate unit 18*a* so as to be movable relative to the substrate unit 18*a*. Here the region extends across an entire extent of the induction coil 14*a*. The fastening unit 20*a* has a fastening element. The fastening element is embodied as a thread 22*a*. The induction coil 14*a* is fastened to the substrate unit 18*a* by means of a joint having the thread 22*a*. The thread 22*a* is embodied completely from silicate. The thread 22*a* is embodied completely from soluble glass. Alternatively, the thread 22*a* could consist of mineral wool and/or glass fibers. The thread 22*a* is guided through one part of the feedthrough openings 24*a*. The thread 22*a* is guided through the feedthrough openings 24*a* in accordance with a Lockstitch sewing method. The thread 22*a* runs completely laterally adjacent to the conductor 16*a* when viewed at right angles onto the substrate unit 18*a*. The thread 22*a* runs parallel to the conductor 16*a*. The thread 22*a* runs at a distance from the conductor 16*a*.

The fastening unit 20*a* has a further fastening element. The induction coil 14*a* is fastened to the substrate unit 18*a* by means of a further joint having a further thread 32*a*. The further thread 32*a* is embodied to be identical to the thread 22*a*. The further thread 32*a* has a further course which is identical to a course of the thread 22*a*. The further thread 32*a* is guided through a further part of the feedthrough openings 24*a*. When viewed at right angles to the substrate unit 18*a*, the further thread 32*a* runs on a side of the conductor 16*a* opposing the thread 22*a*. Prior to operation of the cooking appliance device 10*a* a distance of the thread 22*a* from the conductor 16*a* is at least largely identical to a further distance of the further thread 32*a* from the conductor 16*a*.

The fastening unit 20*a* has a cover element 26*a*. Alternatively, the fastening unit 20*a* could have a plurality of cover elements 26*a*. The cover element 26*a* has a silicate. The cover element 26*a* has basalt fibers. Alternatively or in addition the cover element 26*a* could have spar fibers, dolomite fibers, diabase fibers, anorthosite fibers and/or coke fibers. The cover element 26*a* is embodied to be identical to the substrate unit 18*a*. The cover element 26*a* is arranged on a side of the induction coil 14*a* opposing the substrate unit 18*a*. The cover element 26*a* and the substrate unit 18*a* are sewn to one another within the region. The cover element 26*a* and the substrate unit 18*a* are sewn to one another by means of the joint having the thread 22*a*. The cover element 26*a* and the substrate unit 18*a* are sewn to one another by means of the further joint having the further thread 32*a*. The cover element 26*a* and the substrate unit 18*a* touch in sections in the region. The cover element 26*a* and the substrate unit 18*a* form a stop with respect to a permitted movement of the conductor 16*a*. The stop is formed by the joint and the further joint.

The induction coil 14*a* rests entirely on the cover element 26*a*. Alternatively, the induction coil 14*a* could rest exclusively in the region on the cover element 26*a*. The cover element 26*a* restricts a movement of the induction coil 14*a* on this side. The cover element 26*a*, the thread 22*a* and the further thread 32*a* together define the region. The thread 22*a* and the further thread 32*a* form stops, to which the substrate unit 18*a* and the cover element 26*a* are sewn. The stops restrict a movement of the induction coil 14*a* parallel to a main extension plane of the induction coil 14*a*. In the region the substrate unit 18*a* and the cover element 26*a* restrict a movement of the induction coil 14*a* at right angles to the main extension plane of the induction coil 14*a*. Permitted movements of the conductor 16*a* comprise a movement along a direction 40*a* which faces away with respect to a coil center 34*a*, which, when viewed at right angles onto the substrate unit 18 faces away from the coil center 34*a* of the induction coil 14*a*. The length of the permitted movement along the direction 40*a* is identical to a length by which the conductor 16*a* expands during operation of the cooking appliance device 10*a*. Permitted movements of the conductor 16*a* comprise a movement against the direction 40*a*.

Figure 4:
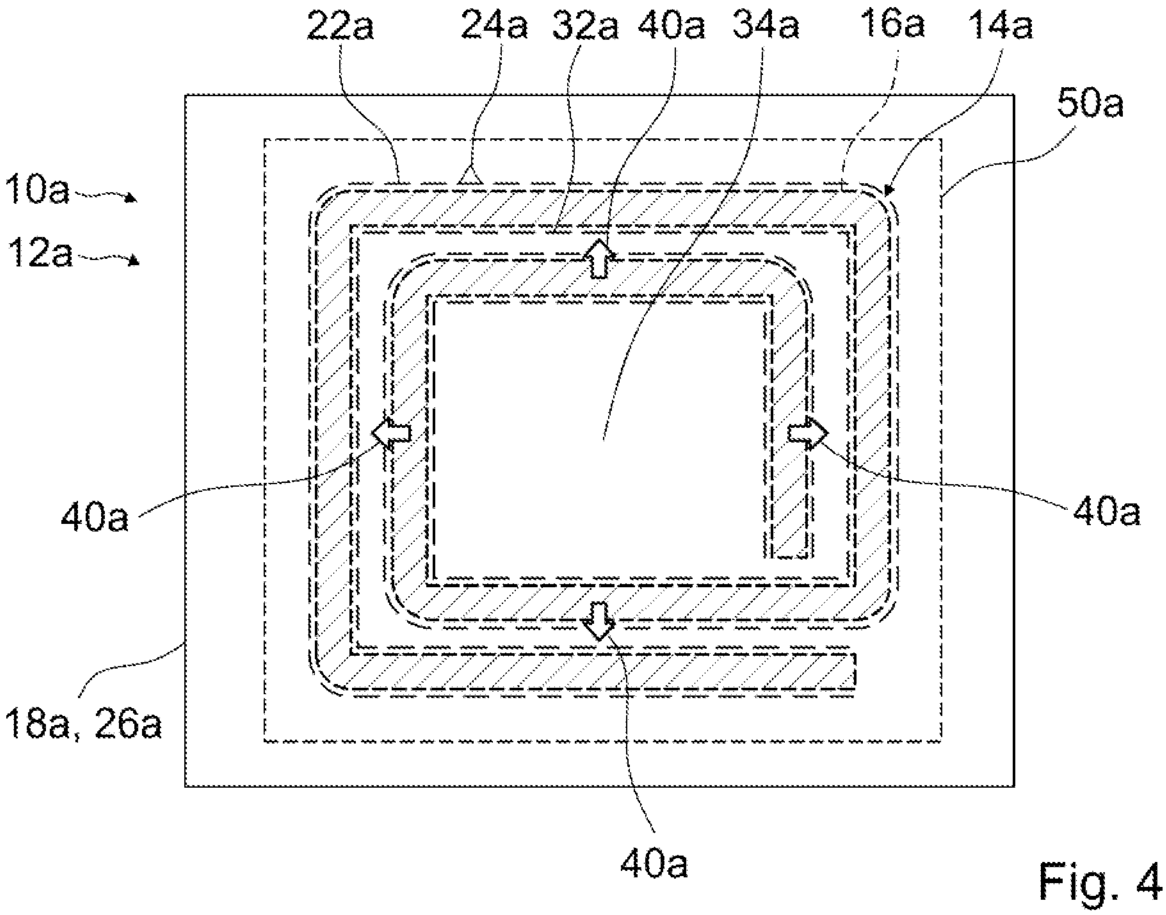

FIG. 4 shows the cooking appliance device 10*a* before operation of the cooking appliance device 10*a*. For reasons of clarity, the induction coil 14*a* is shown in a simplified form with a reduced number of windings and a hatched conductor 16*a*. In addition, the distance between the thread 22*a* and the further thread 32*a* from the conductor 16*a* is shown reduced. The region comprises the entire induction coil 14*a*. The fastening unit 20*a* has an additional thread 50*a*. The additional thread 50*a* runs along a smallest possible rectangle, which just receives a projection of the induction coil 14*a* on the substrate unit 18*a*. The additional thread 50*a* passes entirely around the induction coil 14. The additional thread 50*a* is used to stabilize the substrate unit 18*a* and the cover element 26*a*. During operation of the cooking appliance device 10*a* the conductor 16*a* experiences thermal expansions. The thermal expansions produce expansion movements of the induction coil 14*a* in the direction 40*a*. The expansion movements are movements of the induction coil 14*a* which are permitted within the region.

Figure 5:
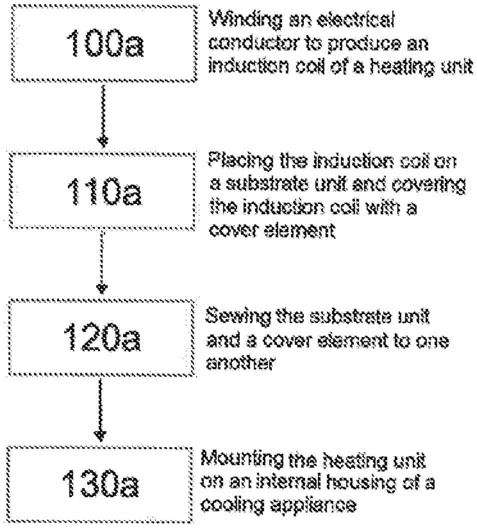

FIG. 5 shows a schematic flow chart of a method for producing the cooking appliance device 10*a*. In one winding step 100*a*, the induction coil 14*a* is produced by winding the conductor 16*a*. Alternatively, the induction coil 14*a* could be produced by winding a stranded wire and/or stamping the conductor 16*a* from a metal plate (not shown).

In an insulation step 110*a*, the induction coil 14*a* is placed on the substrate unit 18*a* and covered with the cover element 26*a*. The insulation step 110*a* here follows on from the winding step 100*a*.

In a sewing step 120*a*, the substrate unit 18*a* and the cover element 26*a* are penetrated by a sewing needle. The substrate unit 18*a* and the cover element 26*a* are sewn to one another according to the Lockstitch sewing method. The thread 22*a* is guided here through a part of the feedthrough openings 24*a*. Then the further thread 32 is guided through further part of the feedthrough openings 24*a* in an identical way. Here the sewing step 120*a* follows on from the insulation step 110.

In an assembly step 130*a*, the heating unit 12*a* is mounted on the internal housing 42*a*. The heating unit 12*a* is screwed to the internal housing 42*a*. Alternatively, the heating unit 12*a* could also be clamped and/or riveted to the internal housing 42*a*.

FIGS. 6*a* to 9 show further exemplary embodiments of the invention. The subsequent descriptions are essentially restricted to the differences between the exemplary embodiments, wherein with respect to the same components, features and functions, reference can be made to the description of the exemplary embodiment in FIGS. 1 to 5. To distinguish between the exemplary embodiments, the letter a in the reference characters of the exemplary embodiment in FIGS. 1 to 5 is replaced by the letters b to i in the reference characters of the exemplary embodiments in FIGS. 6*a* to 9. With respect to components of the same type, in particular with respect to components with the same reference characters, reference can basically also be made to the drawings, and/or the description of the exemplary embodiment in FIGS. 1 to 5.

For the sake of clarity, covered conductors 16*b-g* are shown hatched in the following figures of cover elements 26*b-g*.

Figure 6A:
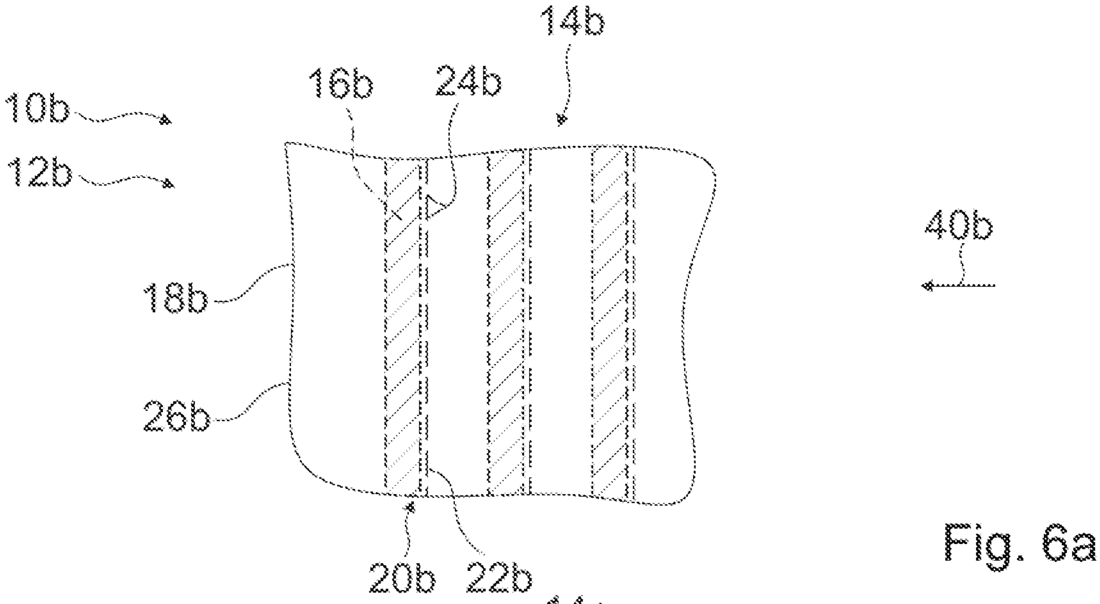
Figure 6B:
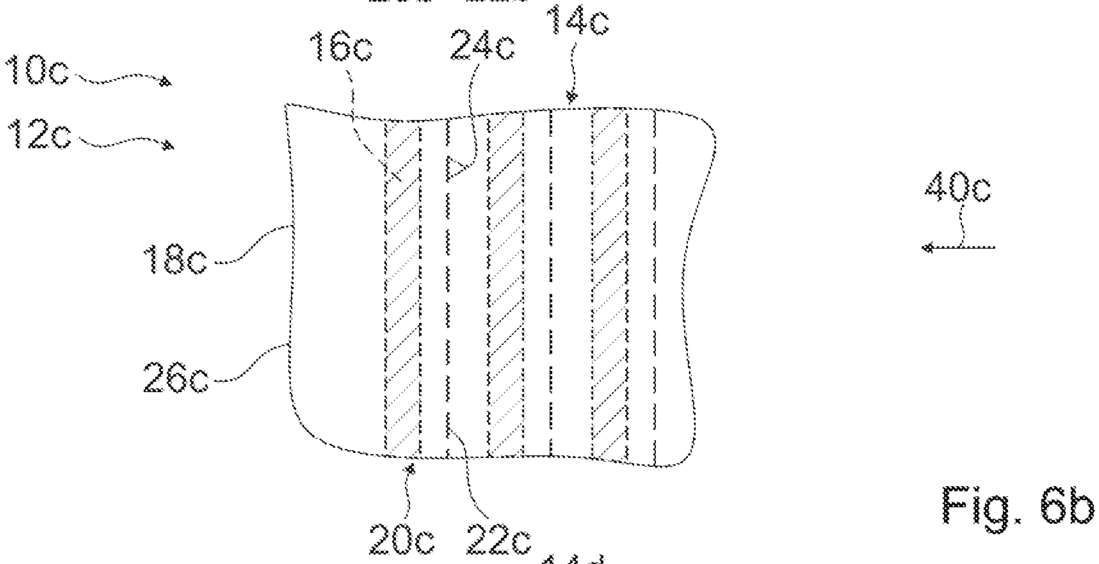
Figure 6C:
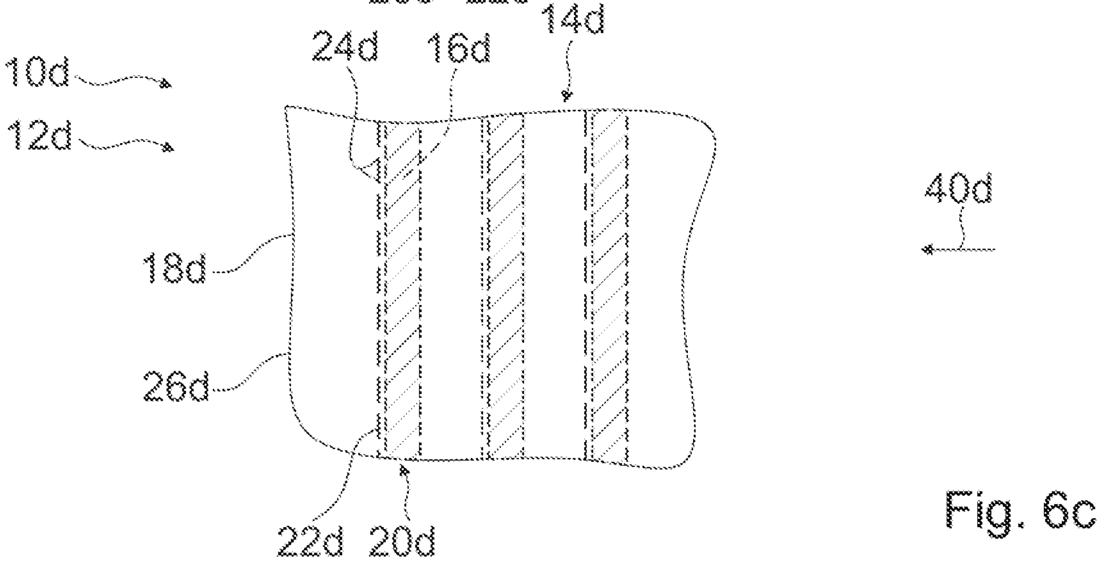

FIGS. 6*a-c* show in each case one part of cooking appliance devices 10*b*, 10*c*, 10*d*. Induction coils 14*b*, 14*c*, 14*d* of the cooking appliance devices 10*b*, 10*c*, 10*d* are fastened to substrate units 18*b*, 18*c*, 18*d* by means of joints having threads 22*b*, 22*c*, 22*d*. Cover elements 26*b*, 26*c*, 26*d* are sewn to one another by means of the joints having the threads 22*b*, 22*c*, 22*d*. In the cooking appliance device 10*b* a thread 22*b* runs along a side of a conductor 16*b*, at a minimal distance from the conductor 16*b*, aligned against a direction 40*b* which faces away with respect to a coil center (not shown). The conductor 16*b* is fastened largely immovably to the substrate unit 18*b* against the direction 40*b*. The substrate unit 18*c* consists entirely of glass fibers. In the cooking appliance device 10*c*, a thread 22*c* runs along a side of a conductor 16*c*, at a distance from the conductor 16*c*, aligned along a direction 40*c* which faces away with respect to a coil center (not shown). The conductor 16*c* is fastened movably to the substrate unit 18*c* along and against the direction 40*c*. In the cooking appliance device 10*d*, a thread 22*d* runs along a side of a conductor 16*d*, at a minimal distance from the conductor 16*d*, aligned along a direction 40*d* which faces away with respect to a coil center (not shown). The conductor 16*d* is fastened immovably to the substrate unit 18*d* along the direction 40*d*.

Figure 7A:
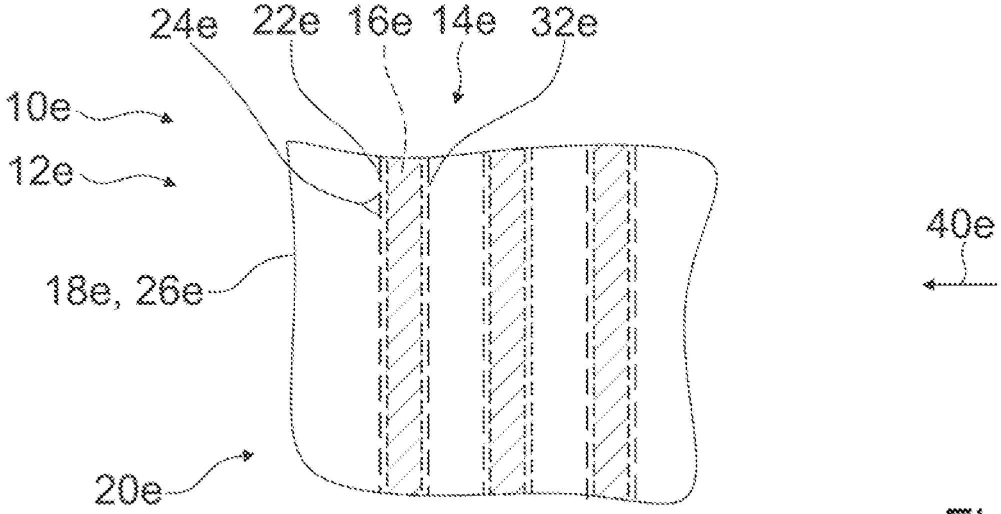
Figure 7B:
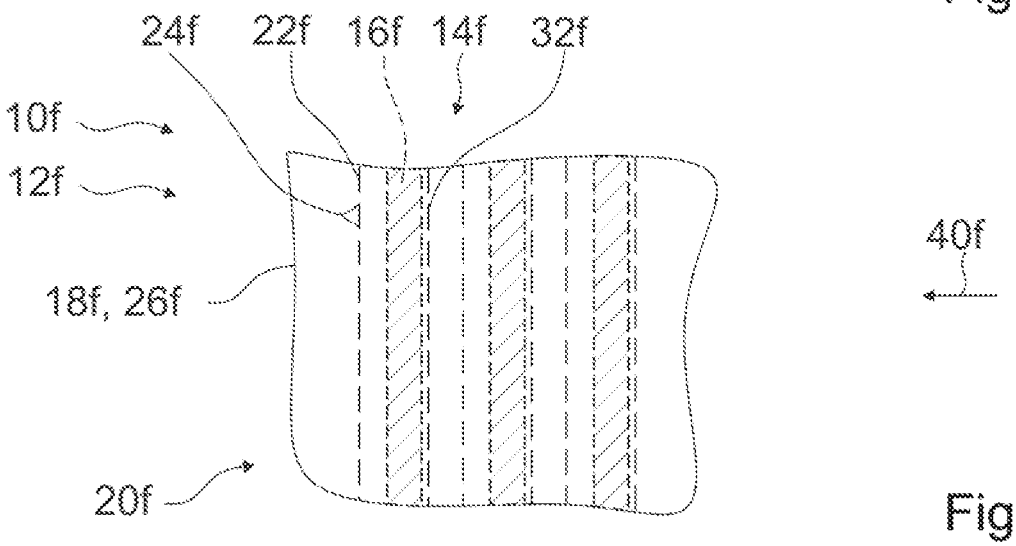
Figure 7C:
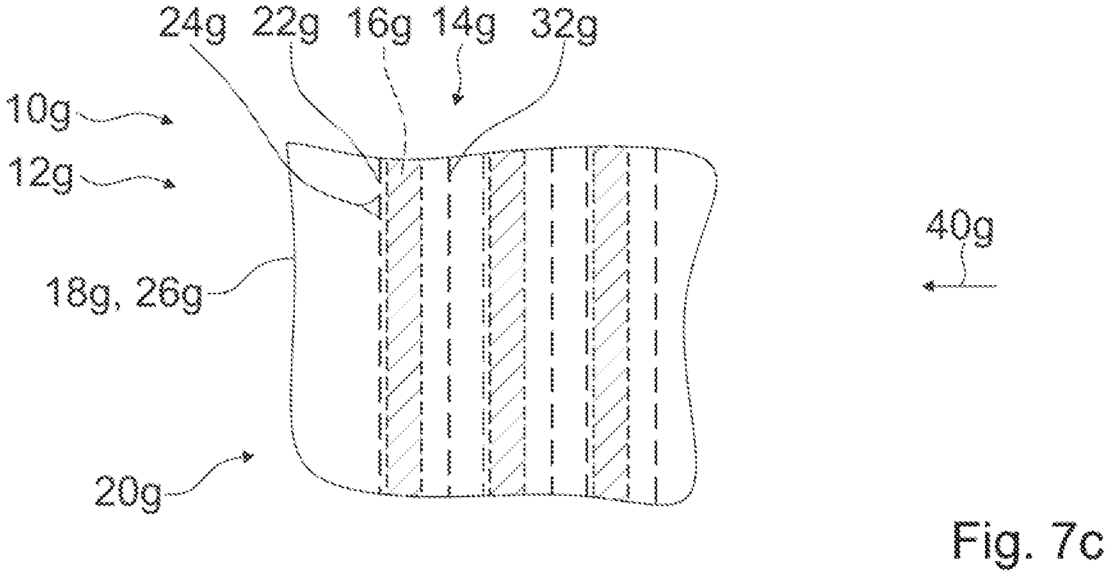

FIGS. 7*a-c* show in each case a part of cooking appliance devices 10*e*, 10*f*, 10*g*. In the cooking appliance devices 10*e*, 10*f*, 10*g* threads 22*e*, 22*f*, 22*g* and further threads 32*e*, 32*f*, 32*g* run along opposing sides of conductors 16*e*, 16*f*, 16*g*. In the cooking appliance device 10*e* the thread 22*e* and the further thread 32*e* run at a minimal distance from the conductor 16*e*. The conductor 16*e* is fastened immovably to a substrate unit 18*e* along and against a direction 40*e* which faces away with respect to a coil center (not shown). A thread 22*f* with a distance from a conductor 16*f* runs in the cooking appliance device 10*f*. A further thread 32*f* runs at a minimal distance from the conductor 16*f*. The conductor 16*f* is fastened immovably to a substrate unit 18*f* against a direction 40*f* which faces away with respect to a coil center (not shown). In the cooking appliance device 10*g*, a thread 22*g* runs 16*g* at a minimal distance from a conductor 16*g*. The thread 32*g* runs at a distance from a conductor 16*g*. The conductor 16*g* is immovably fastened to a substrate unit 18*g* along a direction 40*g* which faces away with respect to a coil center (not shown).

Figure 8A:
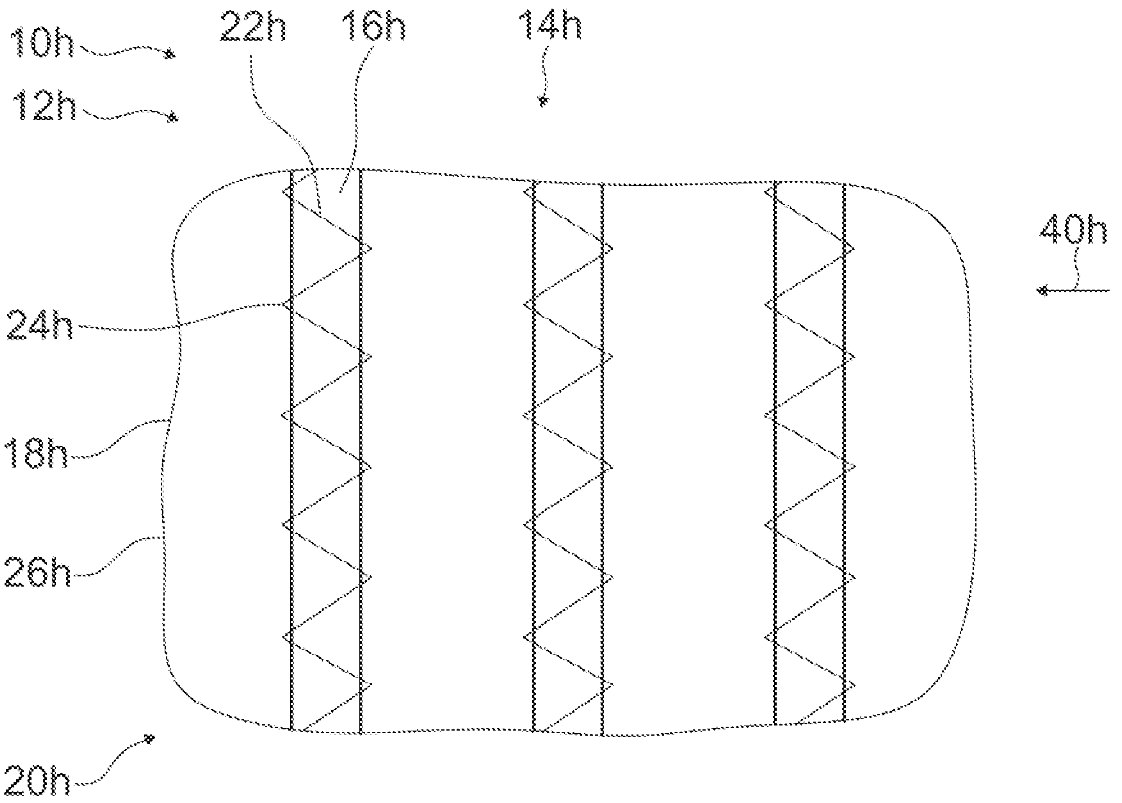
Figure 8B:
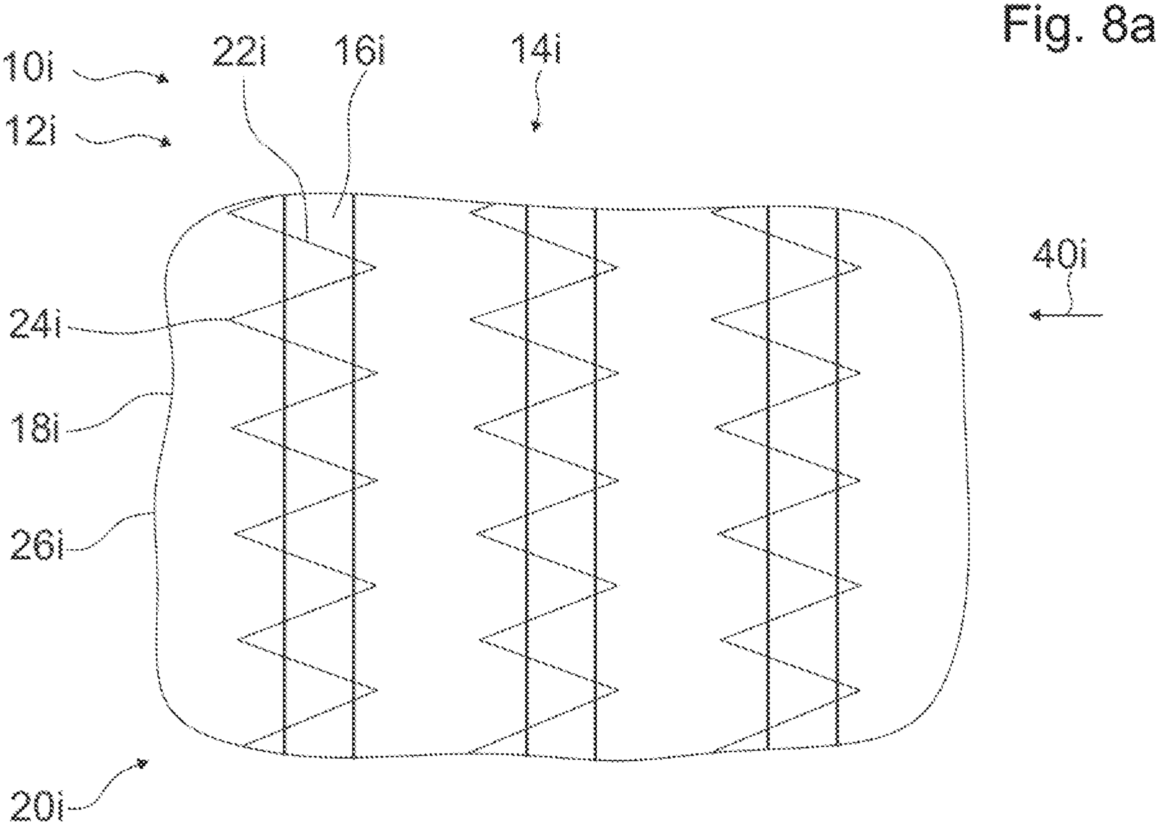

FIGS. 8*a-b* show in each case a part of cooking appliance devices 10*h*, 10*i*. Induction coils 14*h* 14*i* of the cooking appliance devices 10*h*, 10*i* are sewn to substrate units 18*h*, 18*i* completely by threads 22*h*, 22*i*. In the cooking appliance devices 10*h*, 10*i*, the threads 22*h*, 22*i* run in each case at periodic intervals across a conductor 16*h*, 16*i*. The threads 22*h*, 22*i* run in each case in a zigzag pattern. Feedthrough openings 24*h*, 24*i* in each case form reversal points of the zigzag pattern. The threads 22*h*, 22*i* are guided in each case through the feedthrough openings 24*h*, 24*i* according to a zigzag sewing method. Alternatively, the threads 22*h*, 22*i* could each run in sections parallel to the conductors 16*h*, 16*i*. In the cooking appliance device 10*h*, the conductor 16*h* is fastened immovably to the substrate unit 18*h* along a main extension plane of the induction coil 14*h*. The conductor 16*h* is embodied as a stranded wire. In the cooking appliance device 10*i*, part of the feedthrough openings 24*i* runs at a distance from the conductor 16*i*. The part of the feedthrough openings 24*i* is arranged on a side of the conductor 16*i* which is aligned along a direction 40*i* which faces away with respect to a coil center (not shown). The conductor 16*i* is fastened immovably to the substrate unit 18*i* against the direction 40*i*. The cooking appliance devices 10*h*, 10*i* have no cover elements. The joints having the threads 22*h*, 22*i* sew the induction coils 14*h*, 14*i* in each case together with one of the substrate units 18*h*, 18*i*.

Figure 9:
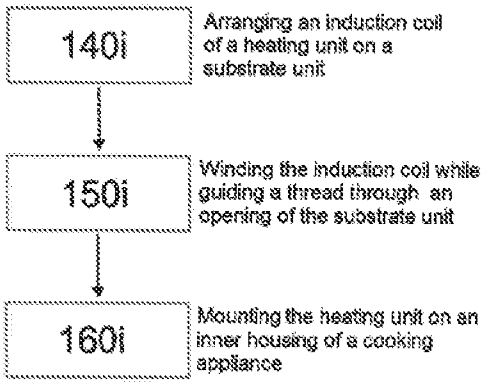

FIG. 9 shows a flow chart of a method for producing the cooking appliance device 10*i*. In a positioning step 140*i*, the induction coil 14*i* is arranged in an unwound state on the substrate unit 18*i*.

In a stitch step 150*i*, the induction coil 14*i* is wound at the same time and the thread 22*i* is guided through the feed-through openings 24*i* in accordance with the zigzag sewing method. The stick step 150*i* here follows on from the positioning step 140*i*.

In an assembly step 160*i*, the heating unit 12*i* is mounted on the internal housing (not shown). The heating unit 12*i* is screwed to the internal housing. Alternatively, the heating unit 12*i* could also be clamped and/or riveted to the internal housing.

The invention claimed is:

1. A cooking appliance device, comprising:
- a heating unit including an induction coil having an electric conductor;
- a substrate unit; and
- a fastening unit configured to fasten the induction coil to the substrate unit, said fastening unit having:
  - a cover element,
  - a thread, and
  - a further thread,
  - the thread and further thread forming both a plurality of stops to which the substrate unit and the cover element are fastened to and at least one region on the substrate unit for fastening the electric conductor in the at least one region on the substrate unit such that the electric conductor is movable relative to the substrate unit.

2. The cooking appliance device of claim 1, constructed in the form of an induction oven device.

3. The cooking appliance device of claim 1, wherein the induction coil is fastened to the substrate unit via a joint which has the thread.

4. The cooking appliance device of claim 3, wherein the induction coil is fastened to the substrate unit via a further joint which has the further thread.

5. The cooking appliance device of claim 1, wherein the thread runs at least in a section across the electric conductor when viewed at a right angle onto the substrate unit.

6. The cooking appliance device of claim 1, wherein the thread runs at least in a section laterally adjacent to the electric conductor when viewed at a right angle onto the substrate unit.

7. The cooking appliance device of claim 1, wherein the further thread, when viewed at a right angle onto the substrate unit, runs at least in a section laterally adjacent to the electric conductor and on a side of the conductor which faces the thread.

8. The cooking appliance device of claim 1, wherein the at least one region has at least two opposing subregions with respect to a coil center of the induction coil, said fastening unit fastening the electric conductor movably to the substrate unit relative to the substrate unit in each of the subregions.

9. The cooking appliance device of claim 1, wherein the electric conductor is permitted to move relative to the substrate unit along a direction which radially faces away from a coil center of the induction coil.

10. The cooking appliance device of claim 1, wherein the cover element is arranged at least in a region on a side of the induction coil which side faces the substrate unit, said cover element restricting a movement of the induction coil on said side.

11. The cooking appliance device of claim 10, wherein the cover element is embodied at least essentially identical to the substrate unit.

12. A cooking appliance, in particular induction oven, comprising a cooking appliance device, said cooking appliance device comprising a heating unit including an induction coil having an electric conductor, a substrate unit, and a fastening unit configured to fasten the induction coil to the substrate unit, said fastening unit having a cover element, a thread, and a further thread, the thread and further thread forming both a plurality of stops to which the substrate unit and the cover element are fastened to and at least one region on the substrate unit for fastening the electric conductor in the at least one region on the substrate unit such that the electric conductor is movable relative to the substrate unit.

13. The cooking appliance of claim 12, wherein the induction coil is fastened to the substrate unit via a joint which has the thread.

14. The cooking appliance of claim 13, wherein the induction coil is fastened to the substrate unit via a further joint which has the further thread.

15. The cooking appliance of claim 12, wherein the thread runs at least in a section across the electric conductor when viewed at a right angle onto the substrate unit.

16. The cooking appliance of claim 12, wherein the thread runs at least in a section laterally adjacent to the electric conductor when viewed at a right angle onto the substrate unit.

17. The cooking appliance of claim 12, wherein the further thread, when viewed at a right angle onto the substrate unit, runs at least in a section laterally adjacent to the electric conductor and on a side of the conductor which faces the thread.

18. The cooking appliance of claim 12, wherein the at least one region has at least two opposing subregions with respect to a coil center of the induction coil, said fastening unit fastening the electric conductor movably to the substrate unit relative to the substrate unit in each of the subregions.

19. The cooking appliance of claim 12, wherein the electric conductor is permitted to move relative to the substrate unit along a direction which radially faces away from a coil center of the induction coil.

20. The cooking appliance of claim 12, wherein the cover element is arranged at least in a region on a side of the induction coil which side faces the substrate unit, said cover element restricting a movement of the induction coil on said side.

21. The cooking appliance of claim 20, wherein the cover element is embodied at least essentially identical to the substrate unit.

22. A method for producing a cooking appliance device, in particular an induction oven device, said method comprising:
- fastening an induction coil of a heating unit to a substrate unit; and
- fastening an electric conductor of the induction coil in at least one region to the substrate unit by using a thread and a further thread to fasten a cover element to the substrate unit to partially contain the electric conductor of the induction coil so as to enable the electric conductor to move relative to the substrate unit.

* * * * *